US010135913B2

(12) United States Patent
Giri et al.

(10) Patent No.: US 10,135,913 B2
(45) Date of Patent: Nov. 20, 2018

(54) IMPACT ANALYSIS SYSTEM AND METHOD

(71) Applicant: Tata Consultancy Services Limited, Mumbai (IN)

(72) Inventors: Soumen Giri, Mumbai (IN); Manish Amaresh Singh, Mumbai (IN); John Wessley Rajappa Doddamani, Mumbai (IN); Shariq Nawaz, Mumbai (IN); Sampathkumar Karuppusamy, Chennai (IN); Arvind Kedarnath Radhakrishnen, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 136 days.

(21) Appl. No.: 15/185,919

(22) Filed: Jun. 17, 2016

(65) Prior Publication Data
US 2016/0373313 A1    Dec. 22, 2016

(30) Foreign Application Priority Data

Jun. 17, 2015   (IN) .......................... 2323/MUM/2015

(51) Int. Cl.
*H04L 29/08* (2006.01)
*H04L 12/24* (2006.01)
*G06F 11/07* (2006.01)

(52) U.S. Cl.
CPC .............. *H04L 67/10* (2013.01); *H04L 41/06* (2013.01); *H04L 41/065* (2013.01); *H04L 41/5035* (2013.01); *G06F 11/079* (2013.01)

(58) Field of Classification Search
CPC ...... H04L 41/06; H04L 41/5035; G06F 11/079
See application file for complete search history.

(56) References Cited

U.S. PATENT DOCUMENTS

| | | | |
|---|---|---|---|
| 7,478,404 B1 * | 1/2009 | Campbell .............. | G06Q 10/06 719/318 |
| 7,536,406 B2 * | 5/2009 | Haselden .................. | G06F 8/24 |
| 7,614,046 B2 * | 11/2009 | Daniels .................... | G06F 8/658 717/170 |
| 7,664,712 B1 | 2/2010 | Duvall et al. | |
| 8,352,914 B2 * | 1/2013 | Sarkar .................... | G06Q 99/00 717/102 |

(Continued)

Primary Examiner — LaShonda T Jacobs
(74) Attorney, Agent, or Firm — Finnegan, Henderson, Farabow, Garrett & Dunner LLP

(57) ABSTRACT

A system and method is provided. The system comprising: a memory storing instructions; a hardware processor configured by the instructions to: receive a request specific one or more infrastructure components in an information technology (IT) infrastructure, process a query based on the request specific to the one or more infrastructure components, identify an interdependency relationship between the one or more infrastructure components and one or more stakeholders based on the query, wherein the interdependency relationship is indicative of mapping across the one or more infrastructure components, and generate, during an outage the one or more infrastructure components in the IT infrastructure, a multi-dimensional inventory impact analysis based on the interdependency relationship comprising an assessment report, the assessment report that includes an inventory landscape the one or more infrastructure components, a dependency analysis in the IT infrastructure, and an impact assessment during the outage.

16 Claims, 13 Drawing Sheets

(56) References Cited

U.S. PATENT DOCUMENTS

| | | | |
|---|---|---|---|
| 8,433,547 B2 | 4/2013 | Dalgas et al. | |
| 8,539,018 B2* | 9/2013 | Bisdikian | G06Q 10/10 |
| | | | 705/7.11 |
| 8,539,060 B2 | 9/2013 | Zhang et al. | |
| 8,543,447 B2* | 9/2013 | Corneil | G06Q 10/06 |
| | | | 705/7.36 |
| 8,570,903 B1 | 10/2013 | Artzi et al. | |
| 8,645,904 B2 | 2/2014 | Coldicott et al. | |
| 8,732,654 B2 | 5/2014 | Venkataraman et al. | |
| 8,914,499 B2* | 12/2014 | Houlihan | G06F 9/5072 |
| | | | 709/224 |
| 9,637,411 B2* | 5/2017 | Sudo | C30B 35/002 |
| 10,002,067 B2* | 6/2018 | Tharippala | G06F 11/3672 |
| 2004/0049365 A1* | 3/2004 | Keller | G06F 11/0709 |
| | | | 702/186 |
| 2006/0031478 A1* | 2/2006 | Gopalkrishnan | G06F 11/3409 |
| | | | 709/224 |
| 2006/0064666 A1* | 3/2006 | Amaru | G06F 17/30557 |
| | | | 717/100 |
| 2007/0033276 A1* | 2/2007 | Brockhoff | G06Q 10/06 |
| | | | 709/224 |
| 2009/0249129 A1* | 10/2009 | Femia | G06F 11/008 |
| | | | 714/47.2 |
| 2009/0254411 A1* | 10/2009 | Bhattacharya | G06Q 10/00 |
| | | | 705/7.28 |
| 2009/0319537 A1* | 12/2009 | Westerfeld | G06Q 10/10 |
| 2010/0268568 A1* | 10/2010 | Ochs | G06Q 10/0633 |
| | | | 705/7.27 |
| 2010/0281455 A1* | 11/2010 | Anand | G06F 8/24 |
| | | | 717/104 |
| 2012/0197681 A1* | 8/2012 | Marrelli | G06Q 10/0633 |
| | | | 705/7.27 |
| 2012/0232948 A1* | 9/2012 | Wolf | G06Q 10/0635 |
| | | | 705/7.28 |
| 2013/0097183 A1* | 4/2013 | McCracken | G06F 11/0709 |
| | | | 707/748 |
| 2014/0280349 A1* | 9/2014 | Rausch | G06F 17/30292 |
| | | | 707/790 |
| 2015/0095102 A1* | 4/2015 | Hanley | G06Q 10/0635 |
| | | | 705/7.28 |
| 2016/0147772 A1* | 5/2016 | Siegmund | G06F 11/3051 |
| | | | 707/722 |
| 2016/0337207 A1* | 11/2016 | Madhav | H04L 41/12 |
| 2017/0024271 A1* | 1/2017 | Teli | G06F 11/0772 |

* cited by examiner

| DATA CENTER | | | PHYSICAL NAME | | | |
|---|---|---|---|---|---|---|
| ALIAS | | | IP ADDRESS | | XXX.XX.XXX.XXX | |
| | | | SUBMIT | | | |

APPLICATIONS IMPACTED FOR APPLICATION SERVER

| SERVER ALIAS | NAME | APPLICATION | IP | DATA CENTER | PRI/CNR |
|---|---|---|---|---|---|
| DB_SERVER_1 | DATABASE_SERVER_1 | TEST_DB_1 | XX.XX.X.X | TEST_DC_1 | PRI |
| APP_SERVER_1 | APPLICATION_SERVER_1 | APP_1 | XX.X.XX.X | TEST_DC_1 | PRI |

APPLICATIONS IMPACTED FOR DATABASE SERVER

| SERVER ALIAS | NAME | APPLICATION | IP | DATA CENTER | DB NAME | PRI/CNR |
|---|---|---|---|---|---|---|
| DB_SERVER_1 | DATABASE_SERVER_1 | TEST_DB_1 | XX.XX.X.X | TEST_DC_1 | TEST.DB.XYZ.COM | |
| APP_SERVER_1 | APPLICATION_SERVER_1 | APP_1 | XX.X.XX.X | TEST_DC_1 | | PRI |

APP DETAILS

| APPLICATION | APP INSTANCE | |
|---|---|---|
| APP_1 | WORLD | TEST_APP_1 |
| TEST_DB_1 | WORLD | TEST_DB_1 |

FIG. 4B

| APPLICATION | TEST_DB_1 | | |
|---|---|---|---|
| DOWNSTREAM APPLICATION | | | |
| SUBMIT | | | |
| APPLICATION | APPLICATION DETAILS | IMPACTED DOWNSTREAM APPLICATION |
|---|---|---|
| TEST_DB_1 | TEST_DB_1 | TEST_UP_APP_1 |
| TEST_DB_1 | TEST_DB_1 | TEST_UP_APP_2 |
| DOWNLOAD | 10 ▼ ◀ ◁ ◀ CURRENT PAGE 1/1 ▷ ▶▶ | |

FIG. 5B

SEARCH FOR [DATA CENTER ▼] SEARCH BY [DATA CENTER NAME ▼]

D
DATA CENTER 1
DATA CENTER 2
DATA CENTER N (SEARCH) ○ TREE VIEW ⦿ TABLE VIEW

| MIDDLEWARE NAME | MIDDLEWARE TYPE | SERVER NAME | SERVER ALIAS | INSTANCE TYPE |
|---|---|---|---|---|
| MW NAME 1 | MW TYPE 1 | SERV NAME 1 | SERV ALIAS 1 | INSTANCE 1 |
| EMPTY MW | EMPTY MW | EMPTY MW | EMPTY MW | EMPTY MW |
| MW NAME 2 | MW TYPE 2 | SERV NAME 1 | SERV ALIAS 1 | INSTANCE 1 |
| MW NAME 3 | MW TYPE 3 | SERV NAME 1 | SERV ALIAS 1 | INSTANCE 1 |

[10 ▼] [<<][<] CURRENT PAGE 1/1 [>][>>]

DO WITH SELECTED [SELECT ▼]

[DOWNLOAD]

FIG. 6B

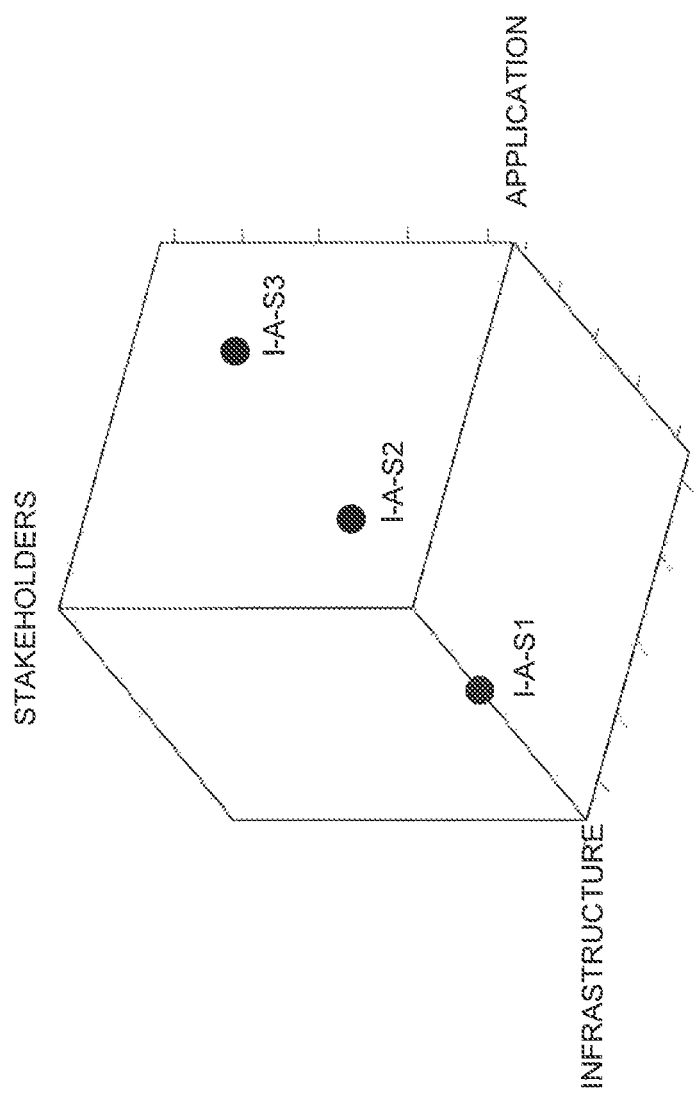

IMPACT ANALYSIS SYSTEM AND METHOD

PRIORITY CLAIM

This U.S. patent application claims priority under 35 U.S.C. § 119 to: India Application No. 2323/MUM/2015, filed on Jun. 17, 2015. The entire contents of the aforementioned application are incorporated herein by reference.

TECHNICAL FIELD

The embodiments herein generally relate to analysis system, and, more particularly, to impact analysis system and method for managing inventories.

BACKGROUND

Enterprises and/or organizations architectures grow in an increasing manner from a variety of heterogeneous computer systems, and applications. Such computer systems and applications execute numerous processes or activities that have substantial impact on business. The time and effort for predicting effects of such processes is in itself a daunting task. Such processes, for example, may include business driven process on an organization, level of interaction of applications with data, hardware and software components within an information technology (IT) environment, and other resources related to third party service providers, etc.

Further, since there is always an increasing demand of information, and business requirements, IT infrastructures continue to proliferate across the network. Such solutions are assisted with tools that create challenges for data manipulation, and are therefore not user friendly. Further, these solutions do not account for data representation, data management, inventory management, and an analysis formulation which leads to an impact on the business processes during an outage.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a computer implemented system comprising: at least one memory storing instructions; at least one hardware processor coupled to the at least one memory, wherein the at least one hardware processor is configured by the instructions to: receive a request specific one or more infrastructure components in an information technology (IT) infrastructure, wherein the one or more infrastructure components comprises at least one of a data center, one or more application servers, one or more database servers, one or more upstream data providers, one or more applications, one or more downstream data providers, one or more middlewares, one or more relational databases, and one or more database schemas, process a query in a database based on the request specific to the one or more infrastructure components in the IT infrastructure, identify an interdependency relationship between the one or more infrastructure components and one or more stakeholders based on the query in the database, wherein the interdependency relationship is indicative of mapping across the one or more infrastructure components, and generate, during an outage the one or more infrastructure components in the IT infrastructure, a multi-dimensional inventory impact analysis based on the interdependency relationship, wherein the multi-dimensional inventory impact analysis provides an assessment report, the assessment report comprising at least one of an inventory landscape of the one or more infrastructure components, a dependency analysis of one or more hardware components and one or more software components in the IT infrastructure, and an impact assessment during the outage of the one or more infrastructure components in the IT infrastructure.

When the request comprises an IP address, the at least one hardware processor is further configured by the instructions to: process the IP address corresponding to the one or more infrastructure components, validate the IP address when the IP address matches an IP address corresponding at least one server, determine the at least one server as (i) an application server from the one or more application servers, or (ii) a database server from the one or more database servers to obtain an identified server, identify an interdependency relationship between the one or more infrastructure components and the one or more stakeholders connected to the identified server, and generate, during an outage of the identified server, a multi-dimensional inventory impact analysis based on the interdependency relationship between the one or more infrastructure components and the one or more stakeholders connected to the identified server, wherein the multi-dimensional inventory impact analysis provides an assessment report, the assessment report comprising at least one of an inventory landscape of the one or more infrastructure components and the one or more stakeholders connected to the identified server.

When the identified server is the application server, the at least one hardware processor is configured by the instructions to query the application server along with application schemas associated with the application server based on the interdependency relationship. When the identified server is the database server, the at least one hardware processor is configured by the instructions to query the database server along with database schemas associated with the application server based on the interdependency relationship.

The at least one hardware processor is further configured by the instructions to: process a request comprising a downstream system identifier, validate the downstream system identifier when the downstream system identifier matches an identifier specific to a downstream data provider to identify a downstream system from the one or more infrastructure components, identify an interdependency relationship between the one or more infrastructure components and the one or more stakeholders connected to the identified downstream system, and generate a multi-dimensional inventory impact analysis during an outage of the identified downstream system based on the interdependency relationship between the one or more infrastructure components and the one or more stakeholders connected to the identified downstream system.

During an outage of the at least one data center, the at least one hardware processor is further configured by the instructions to: query at least one of a database, a server, and at least one application, and schemas specific to the at least one data center, identify an interdependency relationship between the one or more infrastructure components and the one or more stakeholders connected to the at least one data center, and generate, during the outage of the data center, a multi-dimensional inventory impact analysis based on the interdependency relationship, wherein the multi-dimensional inventory impact analysis provides an assessment report, the assessment report comprising at least one of an inventory landscape of the one or more infrastructure components and the one or more stakeholders connected to the at least one data center.

During an outage of the one or more middlewares, the at least one hardware processor is further configured by the instructions to: obtain information pertaining to at least one middleware from the one or more infrastructure components, query at least one of a middleware schema and an application schema specific to the at least one middleware, identify an interdependency relationship between the one or more infrastructure components and the one or more stakeholders connected to the at least one middleware, and generate, during an outage of the at least one middleware, a multi-dimensional inventory impact analysis based on the interdependency relationship, wherein the multi-dimensional inventory impact analysis provides an assessment report, the assessment report comprising at least one of an inventory landscape of the one or more infrastructure components and the one or more stakeholders connected to the at least one middleware.

The outage of the one or more infrastructure components comprises at least one of a shutdown, a migration, a release, a maintenance activity, a downstream activity, and an upstream activity.

In another aspect, a hardware processor implemented method is provided. The method comprising: receiving a request specific to one or more infrastructure components in an information technology (IT) infrastructure, wherein the one or more infrastructure components comprises at least one of a data center, one or more application servers, one or more database servers, one or more upstream data providers, one or more applications, one or more downstream data providers, one or more middlewares, one or more relational databases, and one or more database schemas; processing a query in a database based on the request specific to the one or more infrastructure components in the IT infrastructure; identifying an interdependency relationship between the one or more infrastructure components and one or more stakeholders based on the query in the database, wherein the interdependencies relationship is indicative of mapping across the one or more infrastructure components; and generating, during an outage of the one or more infrastructure components in the IT infrastructure, a multi-dimensional inventory impact analysis based on the interdependency relationship, wherein the multi-dimensional inventory impact analysis provides an assessment report, the assessment report comprising at least one of an inventory landscape of the one or more infrastructure components, a dependency analysis of one or more hardware components and one or more software components in the IT infrastructure, and an impact assessment during the outage of the one or more infrastructure components in the IT infrastructure.

The method further comprises: when the request comprises an IP address, the IP address corresponding to the one or more infrastructure components is processed; and validated when the IP address matches an IP address corresponding to at least one server the at least one server is determined as (i) an application server from the one or more application servers, or (ii) a database server from the one or more database servers to obtain an identified server; an interdependency relationship is identified between the one or more infrastructure components and the one or more stakeholders connected to the identified server; and a multi-dimensional inventory impact analysis is generated based on the interdependency relationship, during an outage of the identified server. The multi-dimensional inventory impact analysis provides an assessment report, the assessment report comprising at least one of an inventory landscape of the one or more infrastructure components and the one or more stakeholders connected to the identified server.

The method further comprises processing a request comprising a downstream system identifier; validating the downstream system identifier when the downstream system identifier matches an identifier specific to a downstream data provider to identify a downstream system from the one or more infrastructure components; identifying an interdependency relationship between the one or more infrastructure components and the one or more stakeholders connected to the identified downstream system; and generating a multi-dimensional inventory impact analysis during an outage of the identified downstream system based on the interdependency relationship between the one or more infrastructure components and the one or more stakeholders connected to the identified downstream system.

The outage of the one or more infrastructure components comprises at least one of a shutdown, a migration, a release, a maintenance activity, a downstream activity, and an upstream activity.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which:

FIG. 4B is a user interface view of the impact analysis system illustrating a table depicting an impact analysis for an IP address according an embodiment of the present disclosure;

FIG. 5B is a user interface view of the impact analysis system illustrating a table depicting an impact analysis for an identified downstream system according an embodiment of the present disclosure;

FIG. 6B is a user interface view of the impact analysis system illustrating a table depicting an impact analysis for a data center according an embodiment of the present disclosure;

FIG. 8 is a graphical representation illustrating a holistic view of Infra-Application-Stakeholder Stack that indicates an impact analysis and interdependency relationship between the one or more infrastructure components and the stakeholders, according an embodiment of the present disclosure.

DETAILED DESCRIPTION

Figure 1:
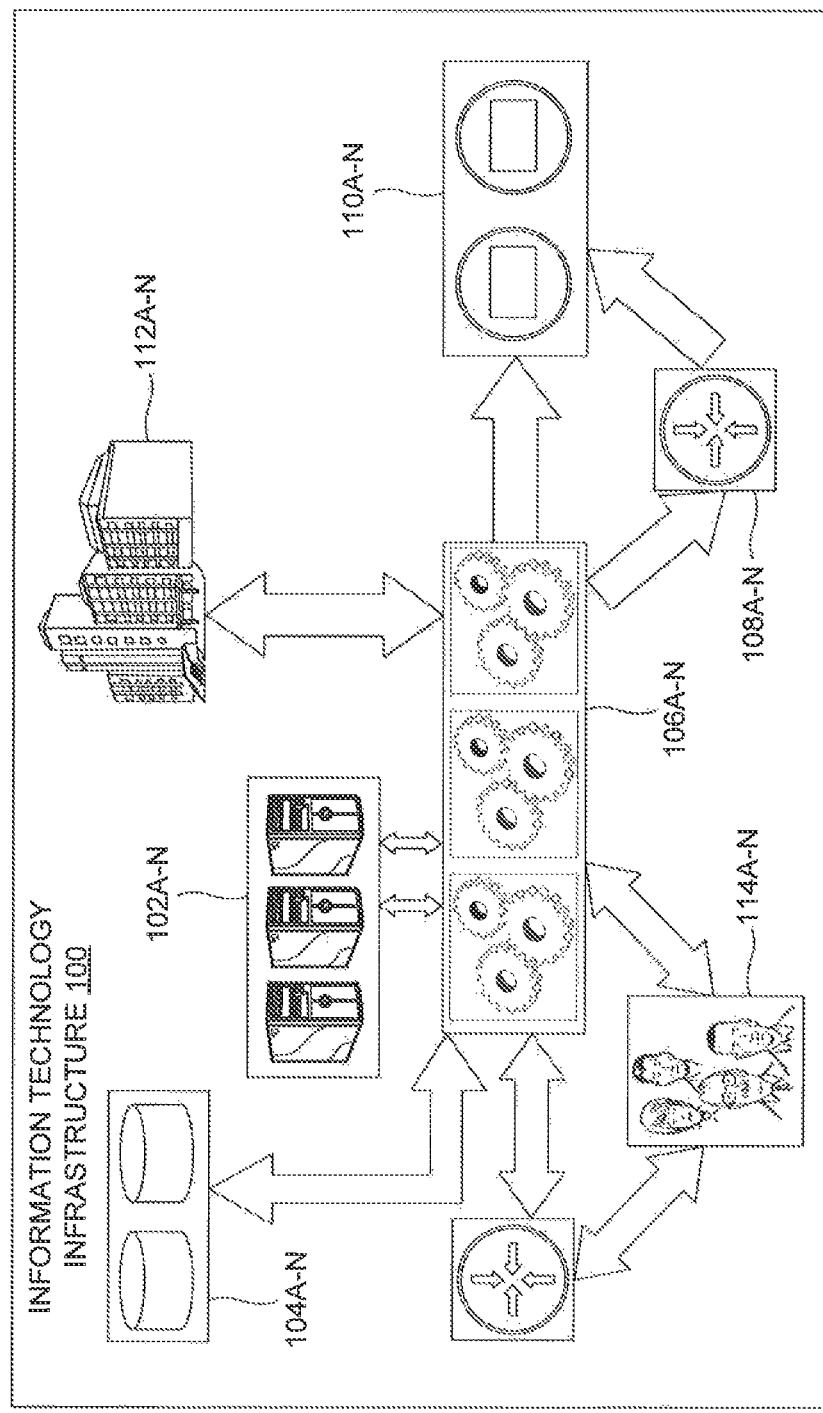
FIG. 1 illustrates an exemplary view of an information technology (IT) infrastructure architecture according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIG. 1 through 8, where similar reference characters denote corresponding features consistently throughout the figures, there are shown preferred embodiments and these embodiments are described in the context of the following exemplary system and/or method.

FIG. 1 illustrates an exemplary view of an information technology (IT) infrastructure architecture 100 according to an embodiment of the present disclosure. The infrastructure architecture 100 comprises one or more infrastructure components, for example, but are not limited to, one or more servers 102A-N, one or more databases 104A-N, one or more applications 106A-N, one or more middlewares 108A-N, one or more down streams 110A-N, one or more external third party service providers 112A-N, and one or more stakeholders 114A-N accessing one or more middlewares 104A-N and one or more applications 106A-N through a network (not shown in FIG. 1). The one or more applications 106A-N are hosted on the one or more servers 102A-N, in an example embodiment. The one or more servers 102A-N comprises one or more database servers, one or more applications servers, or combinations thereof.

It is to be understood for a person having ordinary skill in the art that the one or more infrastructure components communicate with each other through the network.

Figure 2:
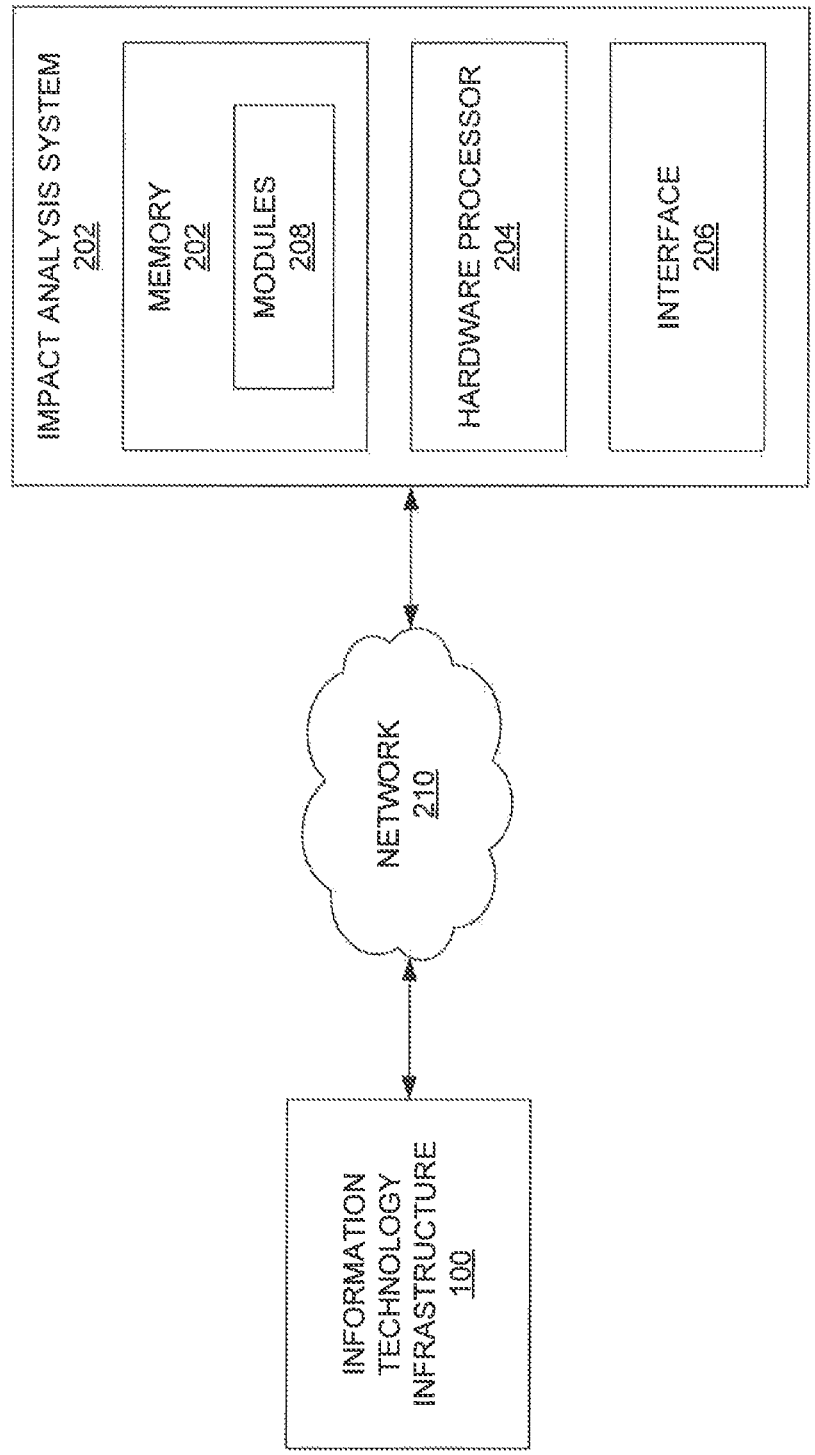
FIG. 2 illustrates an impact analysis system communicatively connected to the infrastructure architecture to generate a multi-dimensional inventory impact analysis according to an embodiment of the present disclosure.

FIG. 2, with reference to FIG. 1, illustrates an impact analysis system 202 communicatively connected to the infrastructure architecture 100 to generate a multi-dimensional inventory impact analysis according to an embodiment of the present disclosure. In one embodiment, the impact analysis system 202 includes or is otherwise in communication with at least one memory such as a memory 204, at least one processor such as a hardware processor 206, and an input/output (I/O) interface 208. The impact analysis system 202 may further include one or more modules 210. The memory 204, the hardware processor 206, the input/output (I/O) interface 208, and/or the modules 210 may be coupled by a system bus or a similar mechanism. The impact analysis system 202 is communicatively connected to the infrastructure architecture 100 through a network 210.

The at least one memory such as the memory 204, may store instructions, any number of pieces of information, and data, used by a computer system, for example the impact analysis system 202 to implement the functions of the impact analysis system 202. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the impact analysis system 202 to carry out various functions in accordance with various example embodiments. Additionally or alternatively, the memory 204 may be configured to store instructions which when executed by the hardware processor 206 causes the impact analysis system 202 to behave in a manner as described in various embodiments.

The at least one processor such as the hardware processor 206 may be implemented as one or more microprocessors, microcomputers, microcontrollers, digital signal processors, central processing units, state machines, logic circuitries, and/or any devices that manipulate signals based on operational instructions. Further, the hardware processor 206 may comprise a multi-core architecture. Among other capabilities, the hardware processor 206 is configured to fetch and execute computer-readable instructions or modules stored in the memory 204. The hardware processor 206 may include circuitry implementing, among others, audio and logic functions associated with the communication. For example, the hardware processor 206 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The hardware processor 206 thus may also include the functionality to encode messages and/or data or information. The hardware processor 206 may include, among other things, a clock, an arithmetic logic unit (ALU) and logic gates configured to support operation of the hardware processor 206. Further, the hardware processor 206 may include functionality to execute one or more software programs, which may be stored in the memory 204 or otherwise accessible to the processor 204.

For example, the hardware processor 206 is configured by the instructions to process one or more requests in the impact analysis system 202. The hardware processor 206 receives a request that is specific one or more infrastructure components in the IT infrastructure. Other infrastructure components comprise at least one of a data center, one or more downstream data providers, one or more middlewares, one or more relational databases, and one or more database schemas, etc. The hardware processor 206 is further configured to process a query in a database (or the memory 204) based on the request specific to the at least one infrastructure component in the IT infrastructure, and identify an interdependency relationship between the one or more infrastructure components and the one or more stakeholders 114A-N based on the query in the database. The interdependency relationship is indicative of mapping across the one or more infrastructure components, and the one or more stakeholders 114A-N. The hardware processor 206 is further configured to generate, during (or prior to) an outage of the one or more infrastructure components (e.g., the components 102A-N till 112A-N) in the IT infrastructure, a multi-dimensional inventory impact analysis based on the interdependency relationship. The multi-dimensional inventory impact analysis provides an assessment report that comprises at least one of an inventory landscape of the one or more infrastructure components (e.g., the components 102A-N till 112A-N), a dependency analysis of one or more hardware components and one or more software components in the IT infrastructure, and an impact assessment during the outage of the one or more infrastructure components (e.g., the components 102A-N till 112A-N) in the IT infrastructure. The outage of the one or more infrastructure components comprises at least one of a shutdown, a migration, a release, a maintenance activity, a downstream activity, and an upstream activity.

Additionally, the impact analysis system 202 provides role based user privilege and user activity audit feature. For example, an administrator who has sufficient privileges (or full control) over the impact analysis system 202, can provide other users role based privileges to access information across the one or more infrastructure components, and may further monitor the activities of these users (e.g., monitoring the log history, access to information history). The administrator may then edit/modify permissions to be provided to the other users based on specific requests received from them. The permissions may include addition, deletion, modification of an entry, data, information, group creation, status (e.g., active, inactive) and so on. These permissions may enable the users to provide inputs to the impact analysis system 202, based on which the impact analysis system 202 can alter the interdependency relationship across the infrastructure components for smooth operation and utilization the one or more infrastructure components effectively. This further enables managing one or more inventories in the IT infrastructure. As used herein the term "inventories" refers to the one or more infrastructure components 102A-112A-N. The term inventories and the one or more infrastructure components are interchangeably used.

The impact analysis system 202 provides large amount data upload, data download, editing and, data manipulation, by (i) processing credentials associated with one or more users, (ii) enabling the login to a database application host based on the validation of credentials, executing a db shell (or a session), (iii) obtaining one or more commands, for example, but are not limited to, Structured Query Language (SQL) commands, into the shell, (iv) verify results based on the commands, (v) committing to the changes (if any), during data upload, data download, editing and, data manipulation, and thereby exiting from the shell.

The I/O interface 208 may include a variety of software and hardware interfaces, for example, a web interface, a graphical user interface, and the like. The I/O interface 208 is configured to facilitate communication between the one or more infrastructure components 102A-N till 112A-N and the impact analysis system 202 through the network 210. The I/O interface 208 may allow the impact analysis system 202 to interact with a user directly or through the other devices, for example, mobile communication device, or a laptop or any computer system, etc. Further, the I/O interface 208 may enable the impact analysis system 202 to communicate with other computing devices, such as web servers and external data servers (not shown in figure). The I/O interface 208 can facilitate multiple communications within a wide variety of networks and protocol types, including wired networks, for example, LAN, cable, etc., and wireless networks, such as WLAN, cellular, or satellite. The I/O interface 208 may include one or more ports for connecting a number of devices to one another or to another server.

The modules 210 include routines, programs, objects, components, data structures, etc., which perform particular tasks or implement particular abstract data types. In one implementation, the above described embodiments and the methodology may be implemented and executed by using the modules 210. For example, the system implements (or executes) a request receiving module that receives a request in the impact analysis system 202, wherein the request is specific to one or more infrastructure components in the IT infrastructure. The modules 210 further comprises a query processing module that processes the query in a database (or the memory 204) based on the request specific to at least one infrastructure component in the IT infrastructure. The modules 210 further comprise a relationship computation module when executed by the hardware processor 206, computes an interdependency relationship between the one or more infrastructure components and the one or more stakeholders 114A-N based on the query in the database. The modules 210 further comprise an analysis module when executed by the hardware processor 206 generates, during an outage of the one or more infrastructure components (e.g., the components 102A-N till 112A-N) in the IT infrastructure, a multi-dimensional inventory impact analysis based on the interdependency relationship. The multi-dimensional inventory impact analysis generated by the analysis module provides an assessment report that comprises at least one of an inventory landscape of the one or more infrastructure components (e.g., the components 102A-N till 112A-N), a dependency analysis of one or more hardware components and one or more software components in the IT infrastructure, and an impact assessment during the outage of the one or more infrastructure components (e.g., the components 102A-N till 112A-N) in the IT infrastructure.

The request receiving module, the query processing module, the relationship computational module, and the analysis module are implemented as a logically self-contained part of a software program that when executed by the hardware processor 206 perform the above method described herein, in one embodiment.

In another embodiment, the request receiving module, the query processing module, the relationship computational module, and the analysis module are implemented are implemented as a self-contained hardware component. In yet another embodiment, the above modules may be implemented as a self-contained hardware component, with a logically self-contained part of a software program embedded into each of the hardware component.

Figure 3:
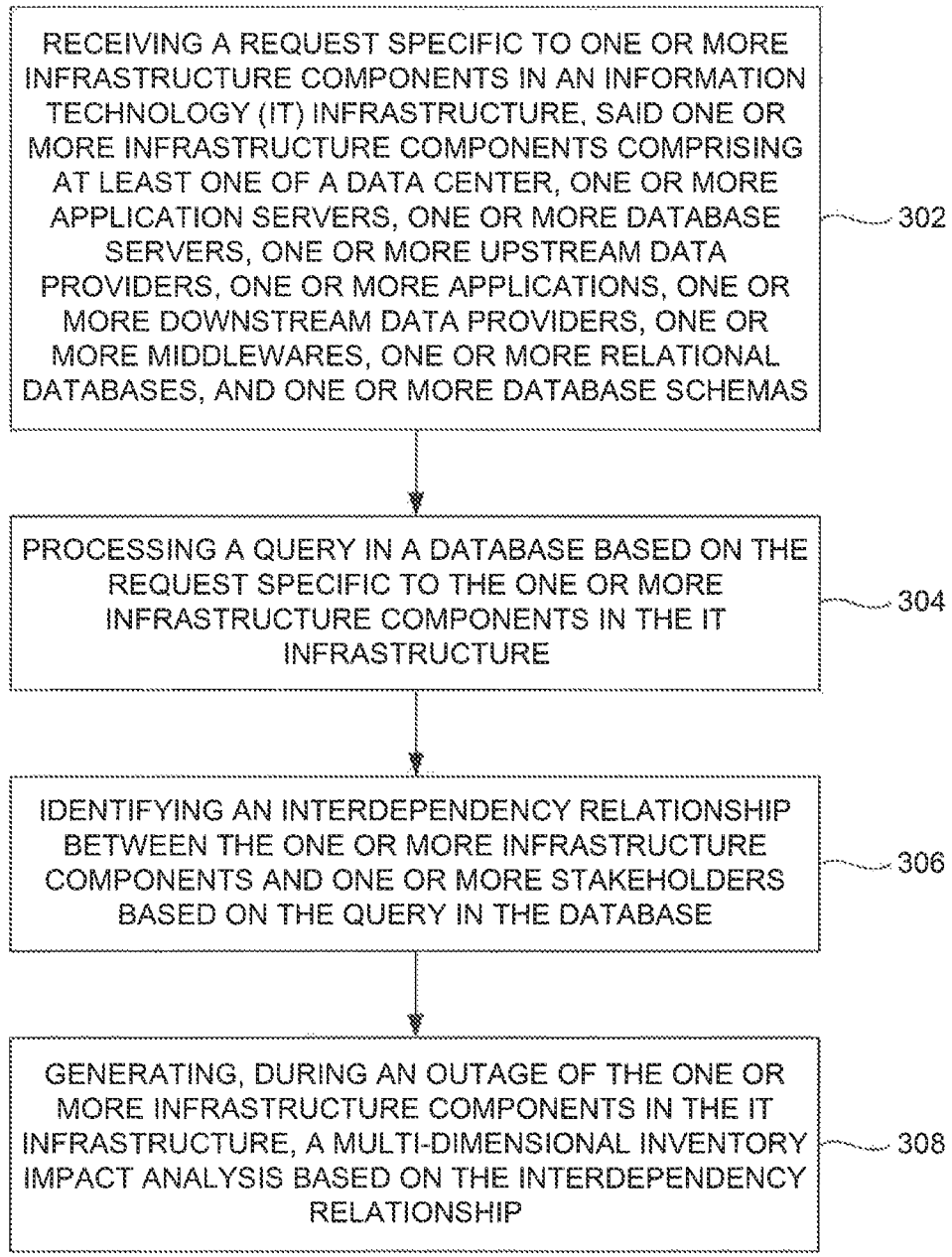
FIG. 3 is a flow diagram illustrating a method for generating a multi-dimensional inventory impact analysis during an outage of the one or more infrastructure components in the IT structure according to an example embodiment of the present disclosure.

FIG. 3, with reference to FIGS. 1 and 2, is a flow diagram illustrating a method for generating a multi-dimensional inventory impact analysis during an outage of the one or more infrastructure components in the IT structure according to an example embodiment of the present disclosure. The method comprising, receiving (302), a request specific to one or more infrastructure components in an information technology (IT) infrastructure, the one or more infrastructure components comprising at least one of a data center, one or more application servers, one or more database servers, one or more upstream data providers, one or more applications, one or more downstream data providers, one or more middlewares, one or more relational databases, and one or more database schemas; processing (304), a query in a database (e.g., the memory 204) based on the request specific to the one or more infrastructure components in the IT infrastructure; identifying (306), an interdependency relationship between the one or more infrastructure components and one or more stakeholders based on the query in the database; and generating (308), during an outage of the one or more infrastructure components in the IT infrastructure, a multi-dimensional inventory impact analysis based on the interdependency relationship.

Figure 4A:
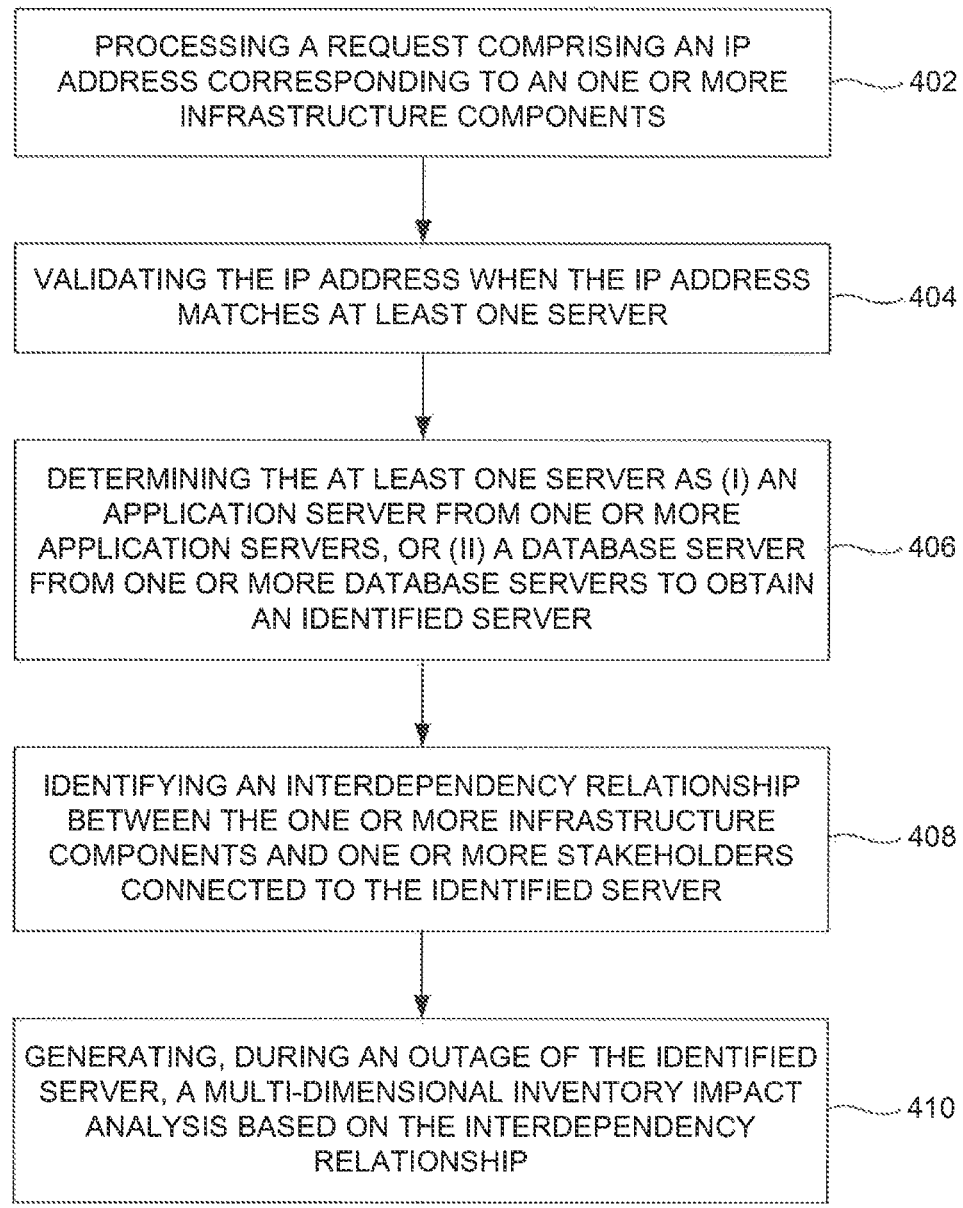
FIG. 4A is a flow diagram illustrating a method for generating a multi-dimensional inventory impact analysis during an outage of a server, according to an example embodiment of the present disclosure.

FIG. 4A, with reference to FIGS. 1 through 3, is a flow diagram illustrating a method for generating a multi-dimensional inventory impact analysis during an outage of a server, according to an example embodiment of the present disclosure. The method comprising processing (402), a request comprising an IP address corresponding to the one or more infrastructure components; validating (404), the IP address when the IP address matches an IP address of at least one server; determining (406), the at least one server as (i) an application server from one or more application servers, or (ii) a database server from one or more database servers to obtain an identified server; generating (408), during an outage of the identified server, a multi-dimensional inventory impact analysis based on the interdependency relationship. The multi-dimensional inventory impact analysis provides an assessment report that comprises at least one of an inventory landscape of the one or more infrastructure components connected to, and the one or more stakeholders accessing, the identified server. When the identified server is the application server, the hardware processor 206 is configured by the instructions to query the application server along with application schemas associated with the application server based on the interdependency relationship. Similarly, when the identified server is the database server, the hardware processor 206 is configured by the instructions to query the database server along with database schemas associated with the database server based on the interdependency relationship.

FIG. 4B, with reference to FIGS. 1 through 4A, is a user interface view of the impact analysis system 202 illustrating a table depicting an impact analysis for an IP address according an embodiment of the present disclosure. The impact analysis system 202 obtains an input, for example, an IP address (XXX.XX.XXX.XXX). When an input, for example, a click through an input interface such as a digital mouse, or a touchpad, is received on a submit button (shown in FIG. 4B), the impact analysis system 202 provides the impact analysis (including an impact assessment) of one or more infrastructure components, and stakeholders, and the interdependency relationship. In particular, as depicted in FIG. 4B, for the above given IP address (during or prior to an outage of an identified server), impact analysis is generated by the impact analysis system 202 for applications impacted for an application server, and applications impacted for a database server. The impact analysis is indicative of a report that comprises, but are not limited to, server alias (e.g., DB_server_1, APP_server_1), server name (e.g., a database server, an application server), applications (e.g., test_DB_1, TEST_APP_1), corresponding IP addresses, and corresponding impacted data centers (e.g., TEST_DC_1), and so on.

Figure 5A:
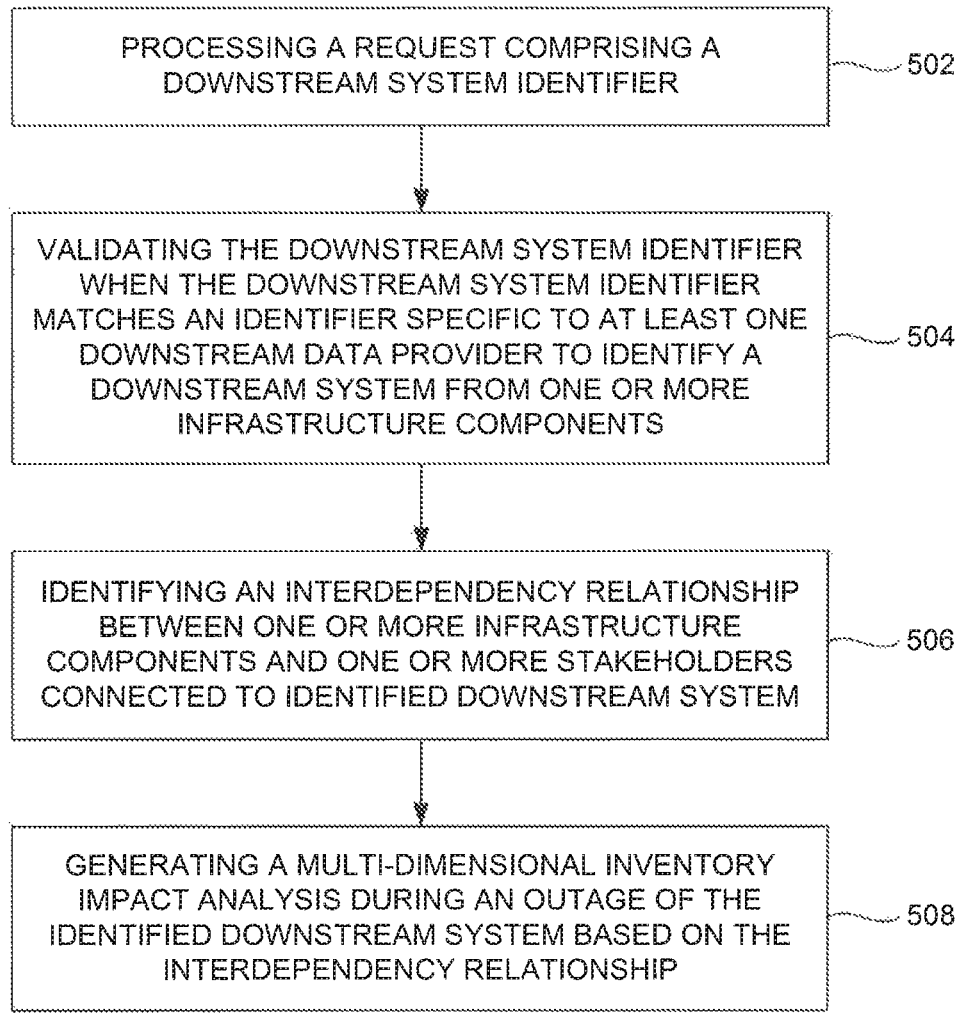
FIG. 5A is a flow diagram illustrating a method for generating a multi-dimensional inventory impact analysis during an outage of downstream system in the IT structure according to an example embodiment of the present disclosure.

FIG. 5A, with reference to FIGS. 1 through 4B, is a flow diagram illustrating a method for generating a multi-dimensional inventory impact analysis during an outage of downstream system in the IT structure according to an example embodiment of the present disclosure. The method comprising processing (502), a request comprising a downstream system identifier; validating (504), the downstream system identifier when the downstream system identifier matches an identifier specific to at least one downstream data provider to identify a downstream system from one or more infrastructure components; identifying (506), an interdependency relationship between one or more infrastructure components and one or more stakeholders connected to identified downstream system; and generating (508), a multi-dimensional inventory impact analysis during an outage of the identified downstream system based on the interdependency relationship.

FIG. 5B, with reference to FIGS. 1 through 5A, is a user interface view of the impact analysis system 202 illustrating a table depicting an impact analysis for an identified downstream system according an embodiment of the present disclosure. In particular, the impact analysis system 202 obtains an input pertaining to a downstream system identifier (e.g., an application identifier, or a system identifier), and outputs an impact analysis (or during or prior to an outage of a downstream component) that comprises a report (including an impact assessment) indicative the interdependency relationship between the impacted downstream applications, and stakeholders.

Figure 6A:
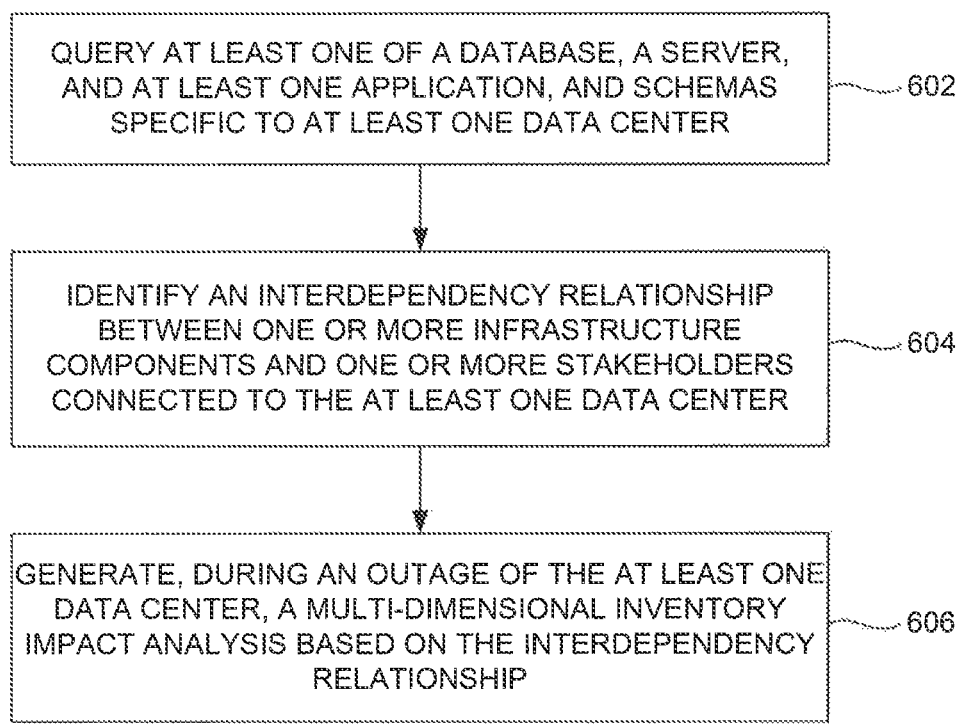
FIG. 6A is a flow diagram illustrating a method for generating a multi-dimensional inventory impact analysis during an outage of a data center in the IT structure according to an example embodiment of the present disclosure.

FIG. 6A, with reference to FIGS. 1 through 5B, is a flow diagram illustrating a method for generating a multi-dimensional inventory impact analysis during an outage of a data center in the IT structure according to an example embodiment of the present disclosure. The method comprising querying (602), at least one of a database, a server, and at least one application, and schemas specific to the data center; identifying (604), an interdependency relationship between the one or more infrastructure components and the one or more stakeholders connected to the data center; and generating (606), during the outage of the data center, a multi-dimensional inventory impact analysis based on the interdependency relationship. The multi-dimensional inventory impact analysis provides an assessment report that comprises at least one of an inventory landscape of the one or more infrastructure components connected to, and the one or more stakeholders accessing, the data center in the IT structure.

FIG. 6B, with reference to FIGS. 1 through 6A, is a user interface view of the impact analysis system 202 illustrating a table depicting an impact analysis for a data center according an embodiment of the present disclosure. In particular, the table depicting the impact analysis (during or prior to an outage of the data center) that comprises an assessment report indicative of an interdependency relationship between one or more middlewares, servers, and so on. For example, as depicted in FIG. 6B, the report comprises details specific to middleware names such as MW name 1, empty MW, MW name 2, and MW name 3, etc. Similarly, the report further comprises middleware type such as, but are not limited to, MW type 1, empty MW, MW type 2, MW type 3, and so on. The report further comprises corresponding server names, such as, but are not limited to, Serv Name 1, empty MW, and so on. The report further comprises corresponding server aliases, such as, but are not limited to, Serv Alias 1, empty MW, and so on. The report further comprises corresponding instance type, such as instance 1, empty MW, and so on. The impact analysis system 202 further provides an option to download the impact analysis in any format (e.g., word processing format, such as a xyz.doc, a xyx.PDF, a xyz.xls, and so on.) using a download button (as shown in FIG. 6B).

Figure 6C:
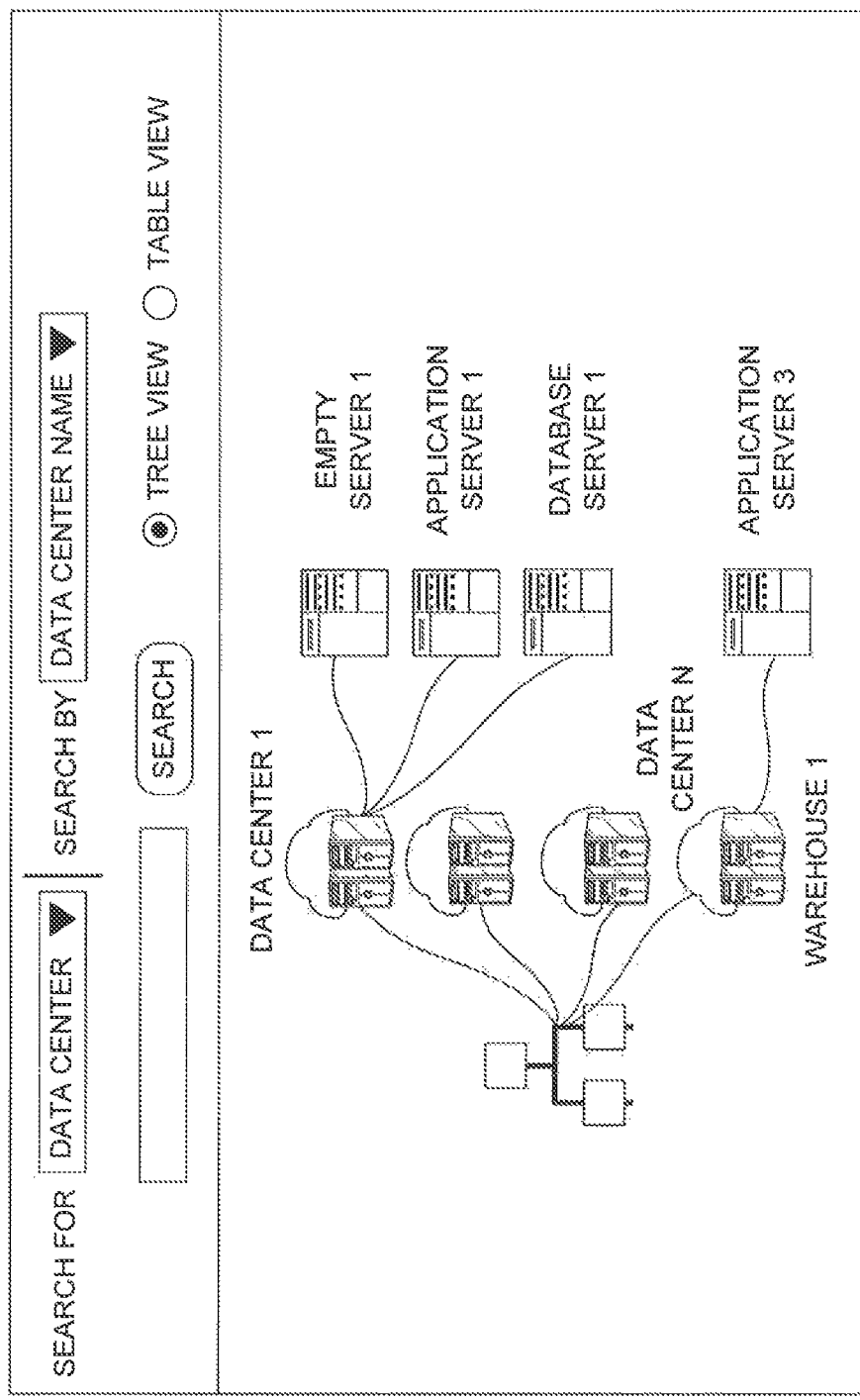
FIG. 6C is a user interface view of the impact analysis system illustrating a tree view depicting an impact analysis for a given data center according to an embodiment of the present disclosure.

FIG. 6C, with reference to FIGS. 1 through 6B, is a user interface view of the impact analysis system 202 illustrating a tree view depicting an impact analysis for a given data center according to an embodiment of the present disclosure. In particular, FIG. 6C depicts an impact assessment comprising an interdependency relationship between the infrastructure components (e.g., application server, database server, and so on.) for a given data center or a warehouse during or prior to an outage of the given data center.

Figure 6D:
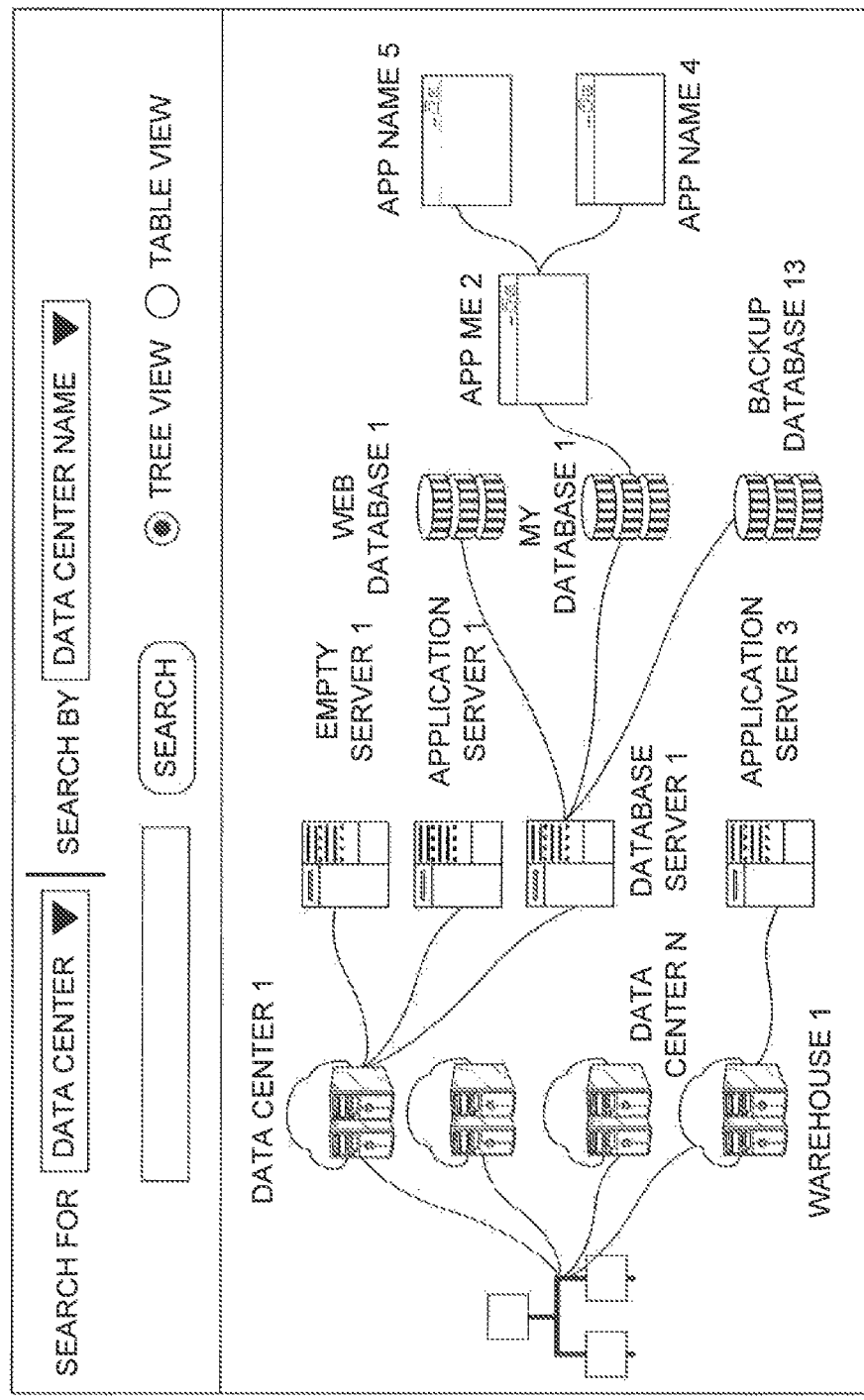
FIG. 6D is a user interface view of the impact analysis system illustrating a tree view depicting an impact analysis for a given data center according to an embodiment of the present disclosure.

FIG. 6D, with reference to FIGS. 1 through 6C, is a user interface view of the impact analysis system 202 illustrating a tree view depicting an impact analysis for a given data center according to an embodiment of the present disclosure. The tree view further depicts an impact assessment comprising an interdependency relationship between one or more data centers 1-N, warehouses, servers such as, empty servers, application servers, and database servers. The interdependency relationship further depicts databases such as, but are not limited to, web database, backup database, my database, and so on. The tree view further depicts an interdependency relationship of a first set of applications (e.g., APP ME 2) connected to my database, and a second set of applications (e.g., APP NAME 4, AND APP NAME 5), that are launched through (or using) the first set of applications.

Figure 7:
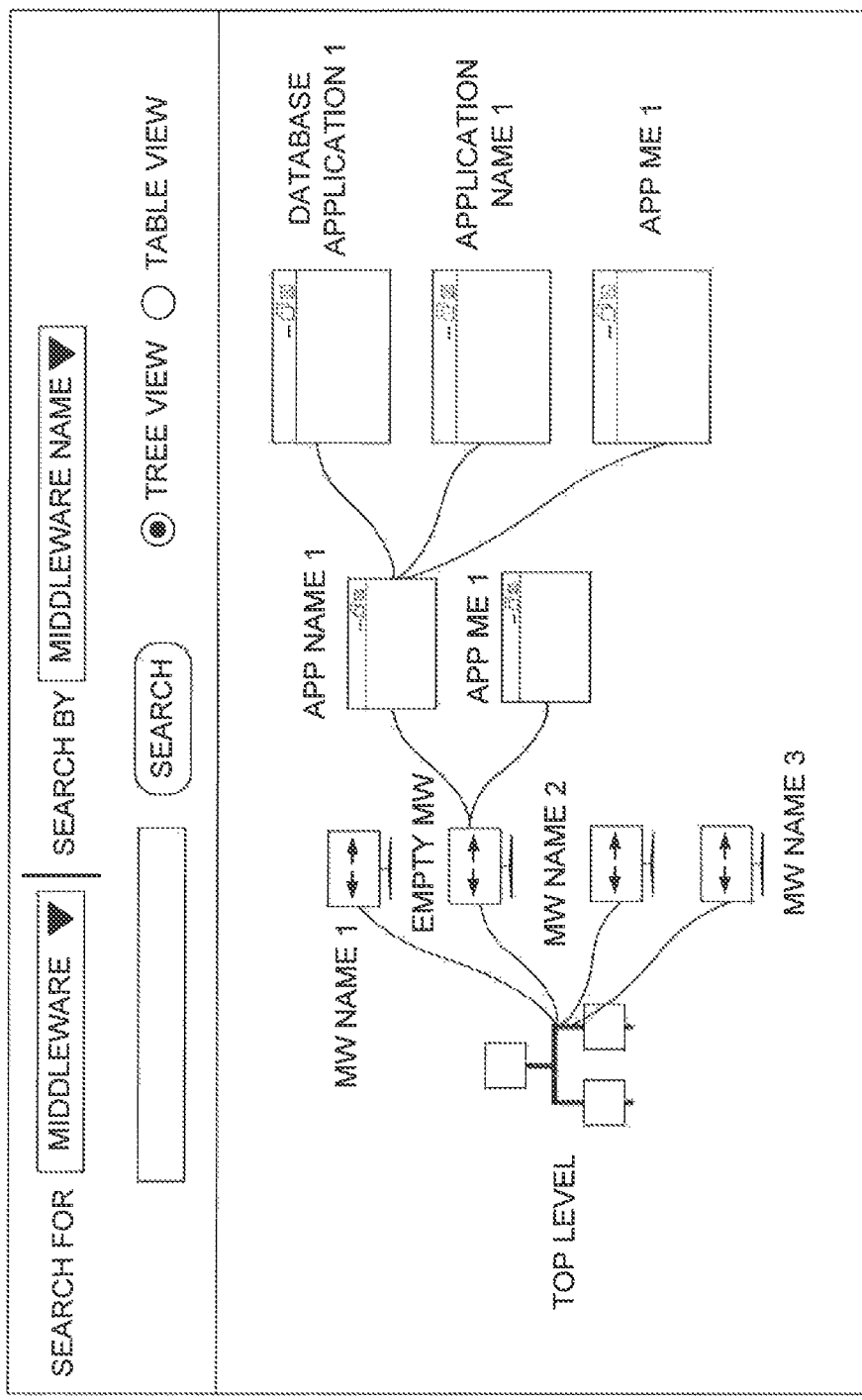
FIG. 7 is a user interface view of the impact analysis system illustrating a tree view depicting an impact analysis for a given middleware according to an embodiment of the present disclosure.

FIG. 7, with reference to FIGS. 1 through 6D, is a user interface view of the impact analysis system 202 illustrating a tree view depicting an impact analysis for a given middleware according to an embodiment of the present disclosure. In particular, the tree view depicts an interdependency relationship between middlewares, applications, and so on during or prior to an outage of the given middleware. For example, a top level tree view is depicted in FIG. 7. The tree view depicts middlewares such as MW Name 1, empty MW, MW Name 2, MW Name 3, and so on. Further the tree view depicts interdependency relationship between the empty MW and applications (e.g., APP Name 1 and APP ME 1). Further the tree view depicts interdependency relationship between the APP Name 1, and other applications such as, but are not limited to, database application 1, application name 1, and APP ME 1).

FIG. 8, with reference to FIGS. 1 through 7, is a graphical representation illustrating a holistic view of Infra-Application-Stakeholder Stack that indicates an impact analysis and interdependency relationship between the one or more infrastructure components and the stakeholders, according an embodiment of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The embodiments of present disclosure herein enables the impact analysis system 202 to identify an infrastructure component based on the request, generate an interdependency relationship between the one or more infrastructure components and the one or more stakeholders connected to the identified infrastructure component. Unlike conventional approaches, the impact analysis system 202 generate a multi-dimensional inventory impact analysis comprising an interdependency relationship between the one or more infrastructure components and the one or more stakeholders connected to the identified infrastructure component. The multi-dimensional inventory impact analysis also provides an assessment report comprising a dependency analysis of the hardware and software components, and an impact assessment during an outage of the identified infrastructure component in the IT infrastructure. This enables the stakeholders to manage the inventories and act upon the situations accordingly, thereby effectively utilization the time and the available resources.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The invention claimed is:

1. A computer implemented system, comprising:
at least one memory storing instructions;
at least one hardware processor coupled to said at least one memory, wherein said at least one hardware processor configured by said instructions to:
receive a request specific to one or more infrastructure components in an information technology (IT) infrastructure, wherein said one or more infrastructure components comprise at least one of a data center, one or more application servers, one or more database servers, one or more upstream data providers, one or more applications, one or more downstream data providers, one or more middlewares, one or more relational databases, and one or more database schemas;
process a query in a database based on said request specific to said one or more infrastructure components in said IT infrastructure;
identify an interdependency relationship between remaining said one or more infrastructure components and one or more stakeholders connected to the one or more infrastructure components based on said query in said database, wherein said interdependency relationship is indicative of mapping across said remaining one or more infrastructure components and said one or more stake holders connected to the one or more infrastructure component; and
generate, during an outage of said one or more infrastructure components in said IT infrastructure, a multi-dimensional inventory impact analysis based on said interdependency relationship, wherein said multi-dimensional inventory impact analysis provides an assessment report, said assessment report comprising at least one of an inventory landscape of said one or more infrastructure components, a dependency analysis of one or more hardware components and one or more software components in said IT infrastructure, and an impact assessment during said outage of said one or more infrastructure components in said IT infrastructure.

2. The computer implemented system of claim 1, wherein when said request comprises an Internet Protocol (IP) address, and wherein said at least one hardware processor is further configured by the instructions to:
process said IP address corresponding to said one or more infrastructure components;
validate said IP address when said IP address matches an IP address corresponding at least one server;
determine said at least one server as (i) an application server from said one or more application servers, or (ii) a database server from said one or more database servers to obtain an identified server;
identify an interdependency relationship between remaining said one or more infrastructure components and said one or more stakeholders connected to said identified server; and
generate, during an outage of said identified server, a multi-dimensional inventory impact analysis based on said interdependency relationship between said remaining one or more infrastructure components and said one or more stakeholders connected to said identified server, wherein said multi-dimensional inventory impact analysis provides an assessment report, said assessment report comprising at least one of an inventory landscape of said one or more infrastructure components and said one or more stakeholders connected to said identified server.

3. The computer implemented system of claim 2, wherein when said identified server is said application server, said at least one hardware processor is configured by said instructions to query said application server along with application schemas associated with said application server based on said interdependency relationship.

4. The computer implemented system of claim 2, wherein when said identified server is said database server, said at least one hardware processor is configured by said instructions to query said database server along with database schemas associated with said application server based on said interdependency relationship.

5. The computer implemented system of claim 1, wherein said at least one hardware processor is further configured by the instructions to:

process a request comprising a downstream system identifier;
validate said downstream system identifier when said downstream system identifier matches an identifier specific to a downstream data provider to identify a downstream system from said one or more infrastructure components;
identify an interdependency relationship between said one or more infrastructure components and said one or more stakeholders connected to said identified downstream system; and
generate a multi-dimensional inventory impact analysis during an outage of said identified downstream system based on said interdependency relationship between said one or more infrastructure components and said one or more stakeholders connected to said identified downstream system.

6. The computer implemented system of claim 1, wherein during an outage of said at least one data center, said at least one hardware processor is further configured by said instructions to:
query at least one of a database, a server, and at least one application, and schemas specific to said at least one data center;
identify an interdependency relationship between said one or more infrastructure components and said one or more stakeholders connected to said at least one data center; and
generate, during said outage of said data center, a multi-dimensional inventory impact analysis based on said interdependency relationship, wherein said multi-dimensional inventory impact analysis provides an assessment report, said assessment report comprising at least one of an inventory landscape of said one or more infrastructure components and said one or more stakeholders connected to said at least one data center.

7. The computer implemented system of claim 1, wherein during an outage of said one or more middlewares, said at least one hardware processor is further configured by said instructions to:
obtain information pertaining to at least one middleware from said one or more infrastructure components;
query at least one of a middleware schema and an application schema specific to said at least one middleware;
identify an interdependency relationship between said one or more infrastructure components and said one or more stakeholders connected to said at least one middleware; and
generate, during an outage of said at least one middleware, a multi-dimensional inventory impact analysis based on said interdependency relationship, wherein said multi-dimensional inventory impact analysis provides an assessment report, said assessment report comprising at least one of an inventory landscape of said one or more infrastructure components and said one or more stakeholders connected to said at least one middleware.

8. The computer implemented system of claim 1, wherein said outage of said one or more infrastructure components comprises at least one of a shutdown, a migration, a release, a maintenance activity, a downstream activity, and an upstream activity.

9. A method, comprising:
receiving, by a processor, a request specific to one or more infrastructure components in an information technology (IT) infrastructure, wherein said one or more-infrastructure components comprises at least one of a data center, one or more application servers, one or more database servers, one or more upstream data providers, one or more applications, one or more downstream data providers, one or more middlewares, one or more relational databases, and one or more database schemas;
processing, by the processor, a query in a database based on said request specific to said one or more infrastructure components in said IT infrastructure;
identifying, by the processor, an interdependency relationship between remaining one or more infrastructure components and one or more stakeholders connected to the one or more infrastructure components based on said query in said database, wherein said interdependency relationship is indicative of mapping across said remaining one or more-infrastructure components and said one or more stake holders connected to the one or more infrastructure components; and
generating, by the processor, during an outage of said one or more infrastructure components in said IT infrastructure, a multi-dimensional inventory impact analysis based on said interdependency relationship, wherein said multi-dimensional inventory impact analysis provides an assessment report, said assessment report comprising at least one of an inventory landscape of said one or more infrastructure components, a dependency analysis of one or more hardware components and one or more software components in said IT infrastructure, and an impact assessment during said outage of said one or more infrastructure components in said IT infrastructure.

10. The method of claim 9, wherein when said request comprises an Internet Protocol (IP) address, said method further comprises:
processing said IP address corresponding to said one or more infrastructure components;
validating said IP address when said IP address matches an IP address corresponding to at least one server;
determining said at least one server as (i) an application server from said one or more application servers, or (ii) a database server from said one or more database servers to obtain an identified server;
identifying an interdependency relationship between said remaining one or more infrastructure components and said one or more stakeholders connected to said identified server; and
generating, during an outage of said identified server, a multi-dimensional inventory impact analysis based on said interdependency relationship, wherein said multi-dimensional inventory impact analysis provides an assessment report, said assessment report comprising at least one of an inventory landscape of said one or more infrastructure components and said one or more stakeholders connected to said identified server.

11. The method of claim 9, further comprising
processing a request comprising a downstream system identifier;
validating said downstream system identifier when said downstream system identifier matches an identifier specific to a downstream data provider to identify a downstream system from said one or more infrastructure components;
identifying an interdependency relationship between said one or more infrastructure components and said one or more stakeholders connected to said identified downstream system; and generating a multi-dimensional inventory impact analysis during an outage of said identified downstream system based on said interdependency relationship between said one or more infrastructure components and said one or more stakeholders connected to said identified downstream system.

12. The method of claim 11, wherein said outage of said one or more infrastructure components comprises at least one of a shutdown, a migration, a release, a maintenance activity, a downstream activity, and an upstream activity.

13. One or more non-transitory machine readable information storage mediums comprising one or more instructions which when executed by one or more hardware processors causes:
receiving a request specific to one or more infrastructure components in an information technology (IT) infrastructure, wherein said one or more infrastructure components comprises at least one of a data center, one or more application servers, one or more database servers, one or more upstream data providers, one or more applications, one or more downstream data providers, one or more middlewares, one or more relational databases, and one or more database schemas;
processing a query in a database based on said request specific to said one or more infrastructure components in said IT infrastructure;
identifying an interdependency relationship between remaining one or more infrastructure components and one or more stakeholders connected to the one or more infrastructure components based on said query in said database, wherein said interdependency relationship is indicative of mapping across said remaining one or more infrastructure components and said one or more stake holders connected to the one or more infrastructure components; and
generating during an outage of said one or more infrastructure components in said IT infrastructure, a multi-dimensional inventory impact analysis based on said interdependency relationship, wherein said multi-dimensional inventory impact analysis provides an assessment report, said assessment report comprising at least one of an inventory landscape of said one or more infrastructure components, a dependency analysis of one or more hardware components and one or more software components in said IT infrastructure, and an impact assessment during said outage of said one or more infrastructure components in said IT infrastructure.

14. The one or more non-transitory machine readable information storage mediums of claim 13, wherein when said request comprises an Internet Protocol (IP) address, said instructions further causes:
processing said IP address corresponding to said one or more infrastructure components;
validating said IP address when said IP address matches an IP address corresponding to at least one server determining said at least one server as (i) an application server from said one or more application servers, or (ii) a database server from said one or more database servers to obtain an identified server;
identifying an interdependency relationship between said remaining one or more infrastructure components and said one or more stakeholders connected to said identified server; and
generating, during an outage of said identified server, a multi-dimensional inventory impact analysis based on said interdependency relationship, wherein said multi-dimensional inventory impact analysis provides an assessment report, said assessment report comprising at least one of an inventory landscape of said one or more infrastructure components and said one or more stakeholders connected to said identified server.

15. The one or more non-transitory machine readable information storage mediums of claim 13, said instructions further causes:
processing a request comprising a downstream system identifier;
validating said downstream system identifier when said downstream system identifier matches an identifier specific to a downstream data provider to identify a downstream system from said one or more infrastructure components;
identifying an interdependency relationship between said one or more infrastructure components and said one or more stakeholders connected to said identified downstream system; and
generating a multi-dimensional inventory impact analysis during an outage of said identified downstream system based on said interdependency relationship between said one or more infrastructure components and said one or more stakeholders connected to said identified downstream system.

16. The one or more non-transitory machine readable information storage mediums of claim 13, wherein said outage of said one or more infrastructure components comprises at least one of a shutdown, a migration, a release, a maintenance activity, a downstream activity, and an upstream activity.

* * * * *